United States Patent [19]

Takeguchi et al.

[11] Patent Number: 5,035,407
[45] Date of Patent: Jul. 30, 1991

[54] FLUID-FILLED POWER UNIT MOUNT

[75] Inventors: Hajime Takeguchi, Yokohama; Toshiyuki Tabata, Sagamihara; Tatsuro Ishiyama, Yokohama, all of Japan

[73] Assignees: Nissan Motor Co., Ltd.; Bridgestone Corporation, both of Japan

[21] Appl. No.: 367,664

[22] Filed: Jun. 19, 1989

[30] Foreign Application Priority Data

Jun. 20, 1988 [JP] Japan ................. 63-151504

[51] Int. Cl.⁵ ............................ F16F 5/00; F16F 9/34
[52] U.S. Cl. ................... 267/140.1; 248/562; 267/219
[58] Field of Search ............... 267/140.1 C, 140.1 R, 267/219, 35, 140.4, 140.5, 141, 141.1; 248/562, 636

[56] References Cited

U.S. PATENT DOCUMENTS

| 4,709,779 | 12/1987 | Takehara | 180/300 |
| 4,728,086 | 3/1988 | Ishiyama et al. | 267/140.1 |
| 4,749,173 | 8/1988 | Kanda | 267/140.1 |
| 4,838,529 | 6/1989 | Orikawa et al. | 267/140.1 |
| 4,848,756 | 7/1989 | Funahashi et al. | 267/140.1 |

FOREIGN PATENT DOCUMENTS

| 0304349 | 2/1989 | European Pat. Off. | 267/140.1 |
| 3619685 | 12/1987 | Fed. Rep. of Germany. | |
| 61-65935 | 4/1986 | Japan. | |
| 62-224746 | 10/1987 | Japan. | |
| 0003340 | 1/1989 | Japan | 267/140.1 |
| 2200190 | 7/1988 | United Kingdom | 267/219 |

Primary Examiner—Matthew C. Graham
Attorney, Agent, or Firm—Leydig, Voit & Mayer

[57] ABSTRACT

A power unit mount through which a power unit is supported on a vehicle body in a manner to insulate vibration transmission. The power unit mount is comprised of an elastomeric support body fixedly interposed between inner and outer cylindrical members which are connected respectively to the vehicle body and the power unit. The elastomeric support body is formed with a hollow defining a main fluid chamber. An elastomeric diaphragm is provided to define an auxiliary fluid chamber which is communicable with the main fluid chamber through first and second orifice passages which extend along the inner periphery of the outer cylindrical member. Liquid fills the main and auxiliary fluid chambers and the orifice passages. In the first orifice passages, the resonance point of the liquid is tuned to increase the loss factor of the power unit mount in response to relatively low frequency vibration, thereby dampening engine shake. In the second orifice passage, the resonance point of the liquid is tuned to lower the dynamic spring constant of the power unit mount in response to relatively high frequency vibration, thereby dampening idling vibration of the power unit. Additionally, a movable plate arrangement is disposed in the second orifice passage and adapted to close the orifice passage in response to the relatively low frequency vibration, thereby permitting fluid passage through only the first orifice passage during input of the relatively low frequency vibration.

17 Claims, 5 Drawing Sheets

FLUID-FILLED POWER UNIT MOUNT

BACKGROUND OF THE INVENTION

1. Field of the Invention

This invention relates to a fluid-filled power unit mount through which a power unit of a vehicle is mounted on a vehicle body, and more particularly to a power unit mount of the type wherein an elastic support body is securely disposed between inner and outer cylindrical members and formed with a chamber filled with a fluid for lowering vibration transmissibility.

2. Description of the Prior Art

In general, a power unit constituted of an engine and a transmission is supported through power unit mounts (engine mounts) on a vehicle body in order to prevent engine vibration and the like from being transmitted to the vehicle body. Such a power unit mount usually includes an elastic support body formed of rubber or the like and securely put between two attachment members which are respectively connected to the vehicle body and the power unit. This elastic support body absorbs vibration transmitted to the power unit mount. Recently in order to improve the ability to lower vibration transmissibility, a fluid chamber to be filled with a liquid is formed in the elastic support body. Such a device is called a fluid-filled power unit mount.

Such a power unit mount is disclosed, for example, in Japanese Patent Provisional Publication No. 61-65935. In this power unit mount, the elastic support body for supporting the load is interposed between inner and outer cylindrical members. The inner cylindrical member is attached to one of the power unit and the vehicle body, while the outer cylindrical member is attached to the other of them. Thus, this power unit mount is of a so-called inner-and-outer cylinder type. Additionally, the elastic support body of this power unit mount is formed with a pair of fluid chambers which communicate with each other through an orifice passage and are filled with liquid. Accordingly, when the elastic support body deforms in accordance with vibration input, the liquid within the fluid chambers move through the orifice passage. By tuning the flowing condition of the liquid at the time of elastic support body deformation, the ability to lower vibration transmissibility under the action of the power unit mount is improved.

With such an inner-and-outer cylinder type power unit mount, the inner and outer cylinders are prevented from being separated from each other even when the elastic support body is broken and the power unit mount can be small-sized. However, difficulties have been encountered in the inner-and-outer cylinder type power unit mount, in which the frequencies of vibration to be damped are unavoidably set within a high vibration frequency region which is far from a low frequency region of so-called engine shake and idling vibration for the following reasons. The fluid chambers are formed in the elastic support body which has a high spring constant, the side walls defining the fluid chamber are thick, and the orifice passage is linear so as to be smaller both in length and cross-sectional area.

In view of the above difficulties, an inner-and-outer cylinder type fluid-filled power unit mount has been as disclosed in Japanese Patent Provisional Publication No. 62-224746 in which one of two fluid chambers is defined by an elastic diaphragm having a smaller spring constant and the orifice passage is arcuate along the inner periphery of the outer cylindrical member to prolong the length of the orifice passage, thus making it possible to tune the mount so as to damp vibration within the low frequency region. However, this power unit mount has only one orifice passage connecting the two fluid chambers, and therefore vibration in only one frequency range within the low frequency region can be effectively damped. Accordingly, it is impossible to damp both engine shake and idling vibration which are within different frequency ranges.

SUMMARY OF THE INVENTION

It is an object of the present invention to provide an improved power unit mount which can effectively suppress or damp vibrations in a low frequency region including engine shake and idling vibration.

Another object of the present invention is to provide an improved power unit mount which can effectively suppress or damp vibrations in a plurality of low frequency ranges such as both engine shake and idling vibration.

A power unit mount of the present invention is for supporting on a vehicle body a power unit which generates first and second vibrations lying in a low frequency range, the second vibrations having a higher frequency than the fist vibrations. The power unit mount of an inner cylindrical member and an outer cylindrical member disposed around the inner cylindrical member. The first and second vibrations are applied between the inner and outer cylindrical members. An elastic support body is securely interposed between the inner and outer cylindrical members to support the load of the power unit. A main fluid chamber is defined in the elastic support body and filled with a fluid. An elastic diaphragm is provided to define an auxiliary fluid chamber which is separate from the main fluid chamber and filled with the fluid. A plurality of orifice passages are formed to fluidly, communicate the main and auxiliary fluid chambers. The orifice passages extend along the inner periphery of the outer cylindrical member and are filled with the fluid. The resonance point of the fluid within at least one of the orifice passages is so set as to damp the vibrations, while the resonance point of the fluid within the remaining orifice passage is so set as to damp the vibrations. Additionally, a fluid movement control device is provided to prevent the fluid from movement through the remaining orifice passage between the main and auxiliary chambers under input of the first vibrations and to allow the fluid to move in the remaining orifice passage between the main and auxiliary fluid chambers under input of the second vibrations.

Thus, according to the present invention, the auxiliary fluid chamber communicable with the main fluid chamber is defined by the elastic diaphragm which has a smaller spring constant than the elastic support body, and the orifice passages communicating the main and auxiliary fluid chambers are formed longer along the inner periphery of the outer cylindrical member. Accordingly, tuning can be performed to suppress or damp engine vibrations in a low frequency region. Additionally, the plurality of orifice passages makes it possible to effectively suppress or damp vibrations at a plurality of frequencies in a low frequency region.

Since the resonance point of the fluid within at least one of these orifice passages is set to effect damp the relatively low frequency first vibrations, displacement of the power unit can be effectively suppressed when engine shake having relatively large amplitude is generated. Additionally, since the resonance point of the fluid within the remaining orifice passage is set to damp the relatively high frequency second vibrations, displacement of the power unit can be effectively suppressed when idling vibration having relatively small amplitude is generated. Furthermore, by virtue of the fluid movement control device provided for the above-mentioned remaining orifice passage, smaller amplitude vibrational movement of the fluid can be stopped in the remaining orifice passage during input of the first vibrations. Consequently, during input of the first vibrations, the fluid vibrational movement is made only through the above-mentioned at least one orifice passage which is tuned for the first vibrations, thereby greatly improving suppression of displacement of the power unit.

DETAILED DESCRIPTION OF THE INVENTION

Figure 1:
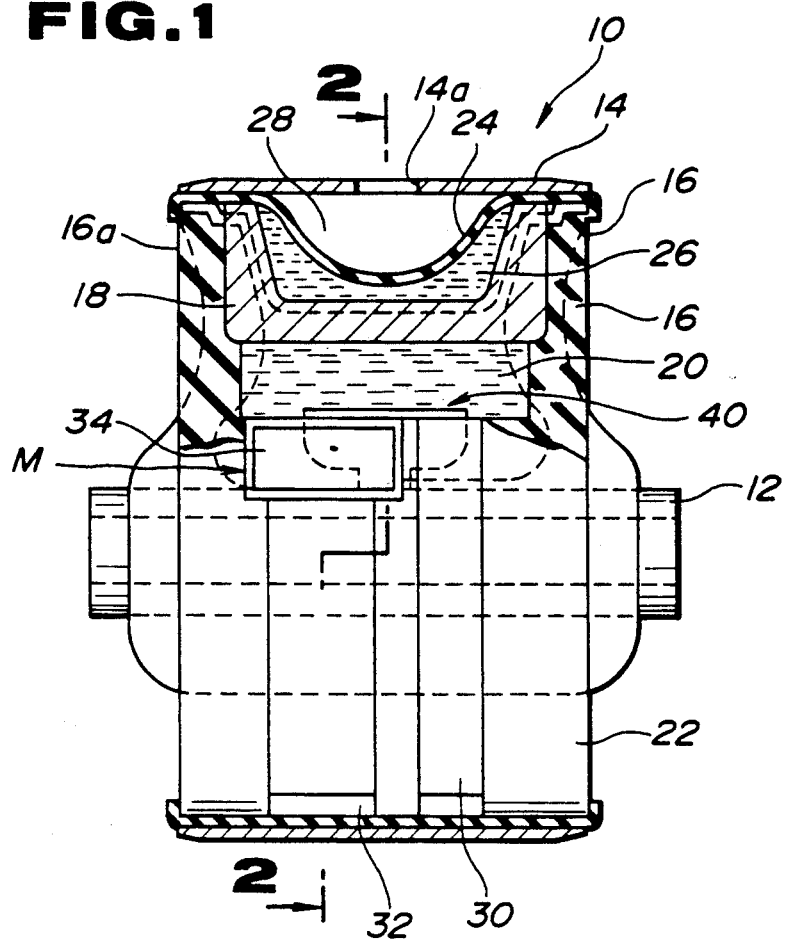
FIG. 1 is a sectional side elevation of a preferred embodiment of a power unit mount in accordance with the present invention.
Figure 2:
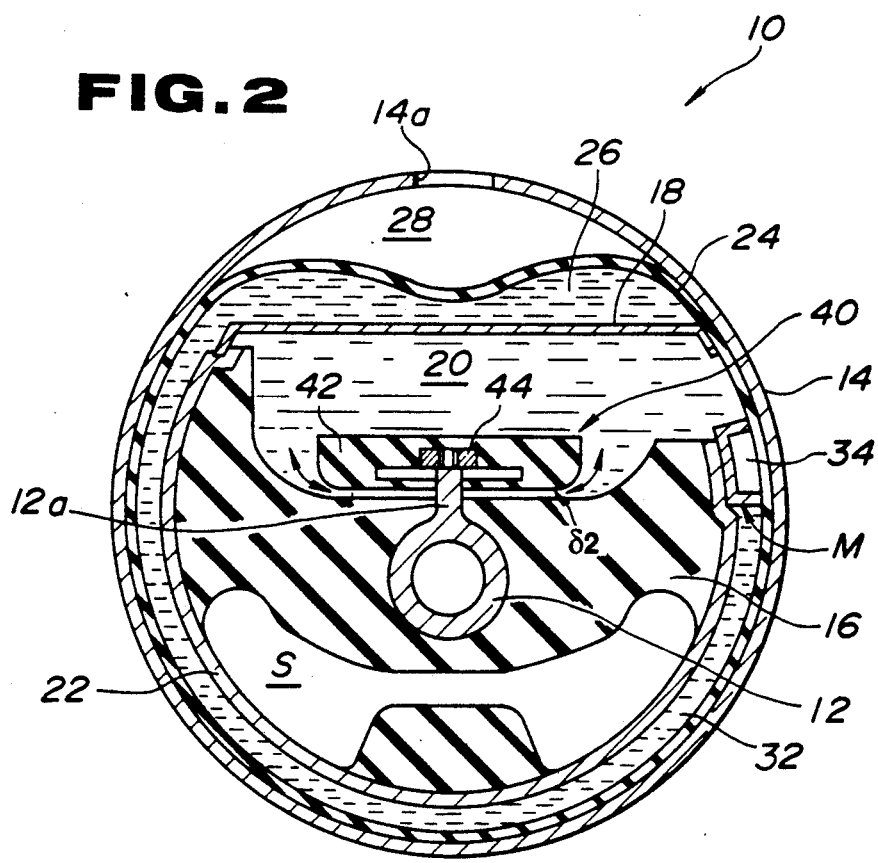
FIG. 2 is a sectional view taken in the direction of arrows substantially along Line 2—2 of FIG. 1.

Referring now to FIGS. 1 to 6 of the drawings, a preferred embodiment of a fluid-filled power unit mount according to the present invention is illustrated by reference numeral 10. The power unit mount 10 of this embodiment is used in an automotive vehicle and comprises an elastic (or elastomeric) support body 16 disposed between a rigid inner cylindrical member 12 and a rigid outer cylindrical member 14 in a manner to elastically connect the inner and outer cylindrical members 12, 14. More specifically, the inner cylindrical member 12 is surrounded by the outer cylindrical member 14 such that the axes of the inner and outer cylindrical member 12, 14 are generally parallel with each other. The elastic support body 16 is made of an elastomeric material such as rubber and disposed within the outer cylindrical member 14 to be fastened to the outer periphery of the inner cylindrical member 12 by vulcanization adhesion. The elastic support body 16 is formed at its bottom section with a space S, as a result of which the elastic body 16 shearing deformation (or generally downward deformation in FIG. 2) when vibration is input to the elastic body 16. Additionally, a part of the upper section of the elastic support body 16 is cut out to form a space (not identified) around the remaining side wall portions 16a, 16b as shown in FIG. 1. The cut out space of the elastic body 16 is covered with a rigid partition plate 18 so that a main fluid chamber 20 is formed between the rigid partition plate member 18 and the surface (defining the space) of the elastic body 16. The partition plate 18 is fixedly secured to a rigid intermediate cylindrical member or orifice structure 22.

A generally cylindrical elastic (elastomeric) diaphragm 24 is disposed on the cylindrical outer periphery of the combined body of the intermediate cylindrical member 22 and the partition plate 18 to cover the cylindrical outer periphery of the combined body. The partition plate 18 is depressed at its central section toward the side of the main fluid chamber 20 as shown in FIG. 1, in which an auxiliary fluid chamber 26 is defined between the depressed surface of the partition wall member 18 and the inner surface of the elastic diaphragm 24.

The outer cylindrical member 14 is fittingly disposed on the outer periphery of the elastic diaphragm 24. An air chamber 28 is defined between the inner periphery of the outer cylindrical member 14 and the elastic diaphragm 24 at a portion defining the auxiliary fluid chamber 26. The air chamber 28 is open to ambient air through an opening 14a formed through the outer cylindrical member 14. The main and auxiliary fluid chambers 20, 26 are in fluid communication with each other through first and second orifice passages 30, 32 which are defined between the inner periphery of the elastic diaphragm 24 and the surfaces of the respective first and second orifice passages 30, 32. The first and second orifice passages 30, 32 extend along the inner periphery of the outer cylindrical member 14 to fluidly connect the right side end section of the main fluid chamber 20 and the left side end section of the auxiliary fluid chamber 26 in FIG. 2. An incompressible fluid (liquid) the main and auxiliary fluid chambers 20, 26 and the first and second orifice passages 30, 32. Accordingly, when the fluid pressure changes upon deformation of the elastic support body 16 during input of vibration, the fluid moves through the first and second orifices 30, 32 between the main and auxiliary chambers 20, 26.

The first orifice passage 30 has such a cross-sectional area that the loss factor of the power unit mount 10 is a maximum in vibration frequencies (around 10 Hz) of so-called engine shake (shaking movement of a power unit) when vibration due to the engine shake is input to the power unit mount 10 or to the elastic support body 16. The loss factor (l) is represented by the equation l=tan δ where δ is a loss angle. The loss angle δ is the difference in phase between vibrational exciting force and vibrational transmitted force when vibration is transmitted through the power unit mount. The second orifice passage 32 has such a cross-sectional area that the dynamic spring constant of the power unit mount 10 is lowest in vibration frequencies (around a range of from 20 to 30 Hz) of so-called idling vibration (vibrational movement of the power unit at idling) during input of the idling vibration to the power unit mount 10 or to the elastic support body 16 of the power unit mount 10. It will be understood that the idling vibration is smaller in amplitude than the engine shake.

Figure 3:
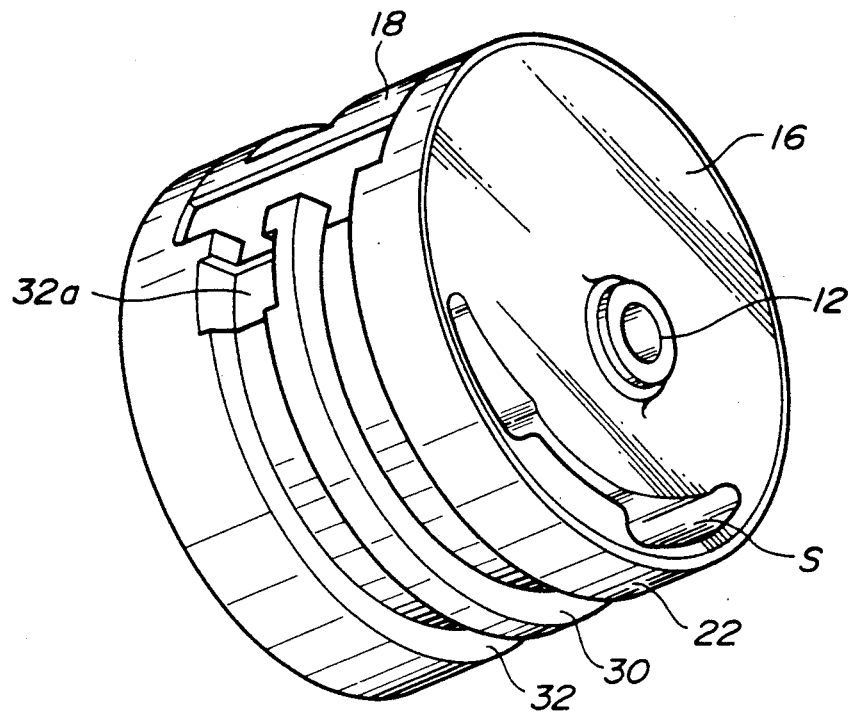
FIG. 3 is a perspective view of the power unit mount of FIG. 1.
Figure 4:
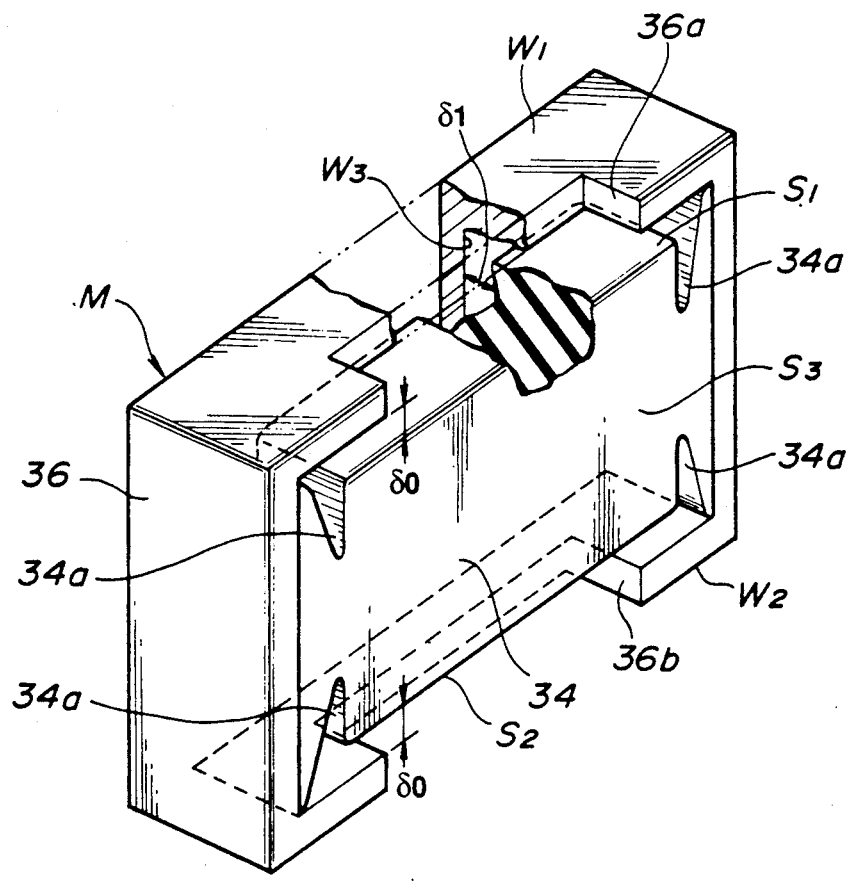
FIG. 4 is an enlarged perspective view of a movable plate arrangement used in the power unit mount of FIG. 1.

A movable plate arrangement M is fittingly disposed in the second orifice passage 32 and located close to the end of the second orifice passage 32 which end is connected with the main fluid chamber 20 in FIG. 4. As shown, the movable plate arrangement M includes a movable plate 34 having generally the shape of a rectangular parallelepiped and made of an elastic (elastomeric) material. The movable plate 34 is fittingly disposed within a casing 36 which is formed with openings 36a, 36b which are respectively located at the upper and lower walls $W_1$, $W_2$ of the casing 36 in FIG. 4. The openings 36a, 36b are opened in the direction of extension of the second orifice passage 32. The upper surface and lower surfaces $S_1$, $S_2$ of the movable plate 34 face the upper and lower walls $W_1$, $W_2$, respectively. Additionally, the upper and lower surfaces $S_1$, $S_2$ of the movable plate 34 are separate from the upper and lower walls $W_1$, $W_2$ of the casing 36, respectively, to form a clearance $\delta_0$. The openings 36a, 36b are located within the plane of projection of the movable plate 34 generally in the direction of extension of the second orifice passage 32. More specifically, the cross-sectional areas of the openings 36a, 36b (defined upon being set in position) of the casing 36 are smaller than the surface areas of the upper and lower surfaces $S_1$, $S_2$ of the movable plate 34, respectively. Accordingly, when the movable plate 34 moves a distance equal to the clearance $\delta_0$ or more vertically in FIG. 4 or generally in the direction of extension of the second orifice passage 34, the movable plate 34 closes the opening 36a, 36b. It is to be noted that a clearance $\delta_1$ is formed between the movable plate 34 and the side or back wall $W_3$ so that a sufficient fluid passage is obtained between the openings 36a, 36b. Accordingly, when the openings 36a, 36b of the casing 36 remain open, the fluid can flow through the clearance $\delta_1$ from one of the openings 36a, 36b to the other. A receiving hole 32a is formed by slightly laterally expanding the second orifice passage 32 at a portion close to the main fluid chamber 20 as shown in FIG. 3. The casing 36 of the movable plate arrangement M is fitted in the receiving hole 32a in such a manner that the fluid can flow between the main fluid chamber 20 and the second orifice passage 32 connected to the auxiliary fluid chamber 26 through the openings 36a, 36b and the clearance $\delta_1$ of the movable plate arrangement M.

In this embodiment, the movable plate 34 is press-fit inside the casing 36 in such a manner that the opposite ends in the longitudinal direction of the movable plate 34 press against the inside wall surfaces of the casing 36. The movable plate 34 is formed with a plurality of cutout grooves 34a located slightly inward from the longitudinally opposite ends thereof. These cutout grooves 34a cause the movable plate 34 to be easily movable vertically in FIG. 4 or generally in the direction of extension of the second orifice passage 32 within a range of the clearance $\delta_0$. The clearance $\delta_0$ which determines amount of movement of the movable plate 34 is set larger than the amplitude (about ±0.3 mm) of the idling vibration and smaller than the amplitude (about ±1 mm) of the engine shake.

An umbrella-shaped orifice forming member 40 is movably disposed within the main fluid chamber 20. The orifice forming member 40 includes an elastic (elastomeric) plate 42 which is fixed to a projection 12a extended from the inner cylindrical member 12 and located spaced a suitable clearance $\delta_2$ from the wall surface of the elastic support body 16 defining the bottom part of the main fluid chamber 20. The lower surface of the elastic plate 42 is flat and generally parallel with the bottom wall surface of the main fluid chamber 20 so that the clearance $\delta_2$ extends relatively wide. The elastic plate 42 is secured to the projection 12a by screwing the tip of the projection 12a into a nut 44 embedded in the elastic plate 42. With this orifice forming member 40, when there is relative displacement between the inner and outer cylindrical members 12, 14, the clearance $\delta_2$ between the elastic plate 42 and the elastic support body 6 changes to cause flow of the fluid in the space or clearance $\delta_2$ between the elastic plate 42 and the elastic support body 16.

Figure 5:
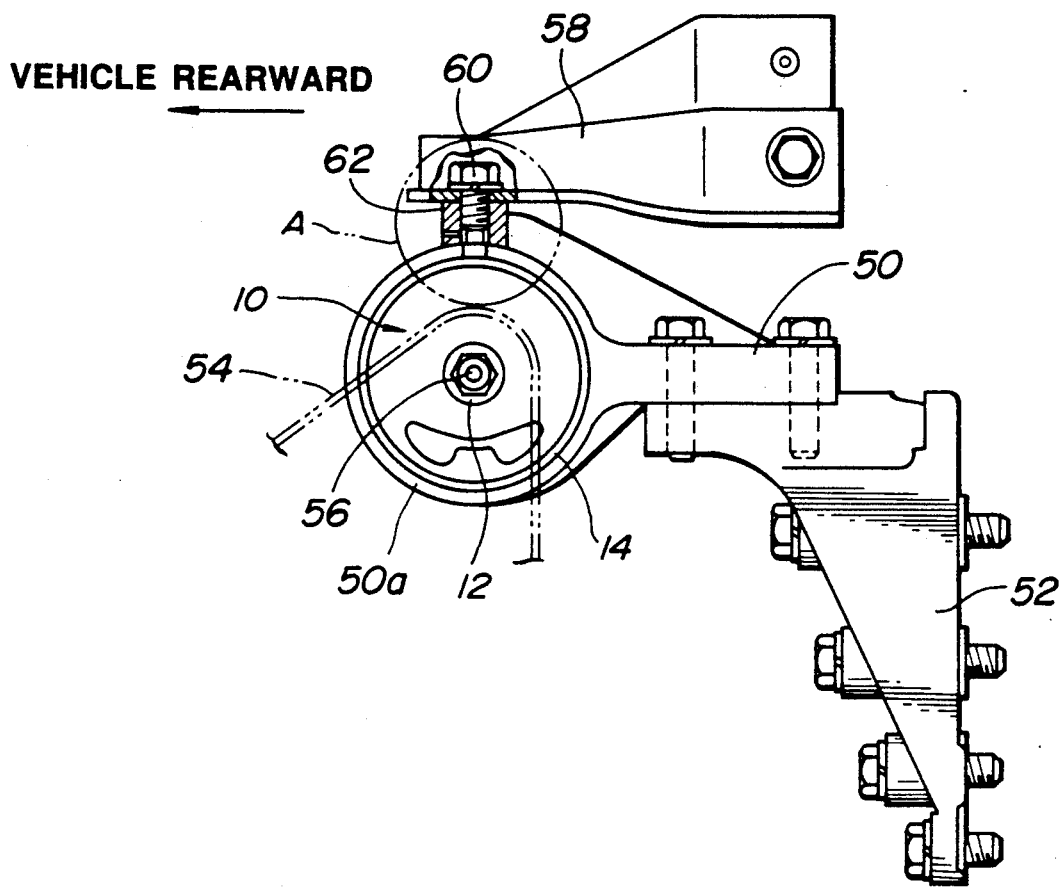
FIG. 5 is a schematic illustration showing an installation state of the engine mount of FIG. 1.
Figure 6:
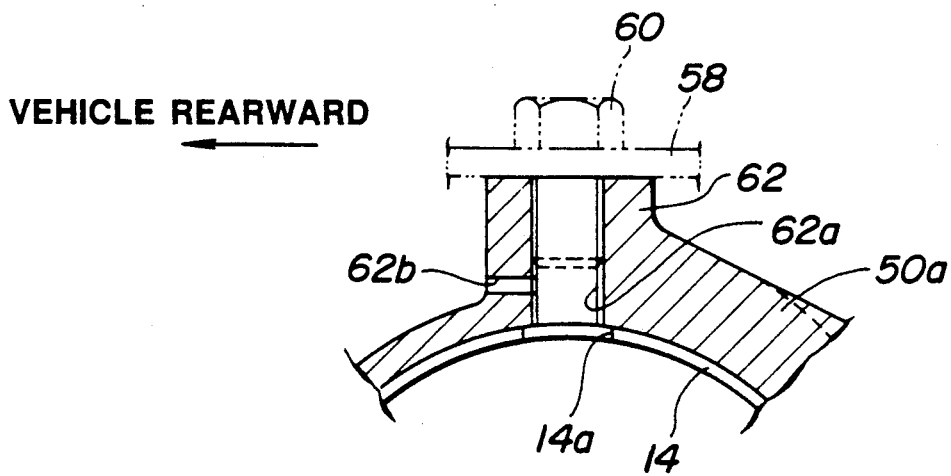
FIG. 6 is an enlarged sectional view of an encircled part of FIG. 5.

An example of installation of the power unit mount of the above-embodiment will be discussed with reference to FIGS. 5 and 6. As shown in FIG. 5, the outer cylindrical member 14 is fitted inside a cylindrical section 50a of a mount bracket 50 which is bolted to a power unit side bracket 52 which can be bolted to a power unit (not shown). The inner cylindrical member 12 is fixedly connected to a pair of vehicle body side brackets 54 which can be fixed to a vehicle body (not shown). More specifically, a bolt 56 is disposed in the inner cylindrical member 12, in which the brackets 54 are fixedly mounted on the bolt 56 and located on the opposite sides of the inner cylindrical member 12. The upper portion of the cylindrical section 50a is fixedly connected through a stay 58 to the power unit side to increase the installation strength of the mount bracket 50 to the power unit side thereby increasing the natural frequency of the mount bracket 50.

The mount bracket cylindrical section 50a has an integral boss section 62 into which a bolt 60 is screwed, the bolt 60 being for installing the stay 58 on the mount bracket 50. Here, as best shown in FIG. 6 which is an enlarged view of a section enclosed by a circle A in FIG. 5, the threaded bore 62a of the boss section 62 is in communication with the opening 14a through which the air chamber 28 is in communication with the ambient air. The threaded bore 62a communicates with a small diameter hole 62b which is directed towards the rear of a vehicle and open to the ambient air. The small diameter hole 62b is formed generally perpendicular to the threaded bore 62a. As seen from FIG. 6, the bolt 60 has such a length that the bottom end thereof is located slightly above the level of the small diameter hole 62b when screwed into position. Thus, the air chamber 28 is open to the ambient air through the small diameter hole 62b and therefore is prevented from the entry of foreign matter such as muddy water. In this connection, the axis of the small diameter hole 62b may incline downward in the direction toward the rear of the vehicle.

When vibration is input between the vehicle body and the power unit, i.e., between the inner and outer cylindrical members 12, 14, the elastic support body 16 deforms to change the fluid pressure within the main fluid chamber 20. As a result, the fluid moves between the main and auxiliary fluid chambers 20, 26 through the first and second orifice passages 30, 32.

As discussed above, the resonance points of the fluids within the first and second orifices 30, 32 can be tuned to correspond to engine shake and the idling vibration in a low frequency region, under a condition that the auxiliary fluid chamber 26 is defined by the elastic diaphragm having a smaller spring constant and the first and second orifice passages 30, 32 are long and artuate and extend long along the inner periphery of the outer cylindrical member 14.

Figure 7:
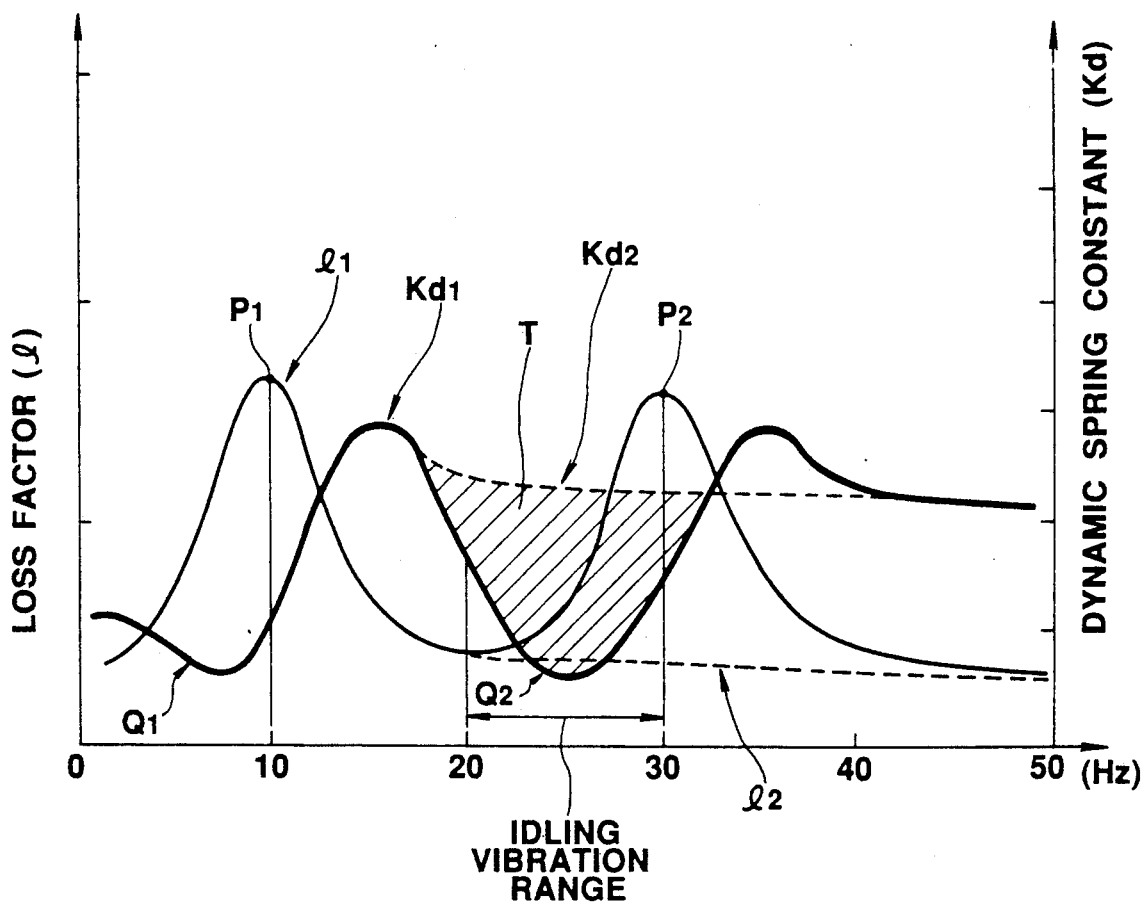
FIG. 7 is a graph illustrating the effects of a second orifice passage in the power unit mount of FIG. 1 in terms of loss factor and dynamic spring constant.

During generation of the engine shake in a relatively low frequency range (around 10 Hz) the loss factor of the power unit mount is on maximum at engine shake frequencies under movement of the fluid within the first orifice passage 30, thus effectively suppressing large displacements (swinging movement) of the power unit. More specifically, in order to maximize the loss factor during generation of engine shake, the fluid within the first orifice passage 30 performs resonance vibration at frequency slightly lower than the vibration frequencies (around 10 Hz) thereby attaining a maximum or peak value $P_1$ of the loss factor l as shown in FIG. 7 in which line $l_1$ indicates the loss factor characteristics of the power unit mount 10 while line $Kd_1$ indicates a dynamic spring constant of the power unit mount 10. Although the lowest value $Q_1$ of the dynamic spring constant Kd of the power unit mount appears at the resonance point of the fluid within the first orifice passage 30, this hardly affects engine shake suppression because of it does not coincide with the above-mentioned peak value $P_1$.

During generation of the idling vibration having a frequency of relatively high frequency of vibration (around 20 to 30 Hz) the idling vibration is noticeably suppressed and prevented from being transmitted to the vehicle body since the dynamic spring constant of the power unit mount is lowered to its lowest value in the vibration frequencies of the idling vibration under movement of the fluid within the second orifice passage 32. More specifically, in order to lower the dynamic spring constant of the power unit mount 10 in the vibration frequencies of the idling vibration, the fluid within the second orifice passage 32 resonates during generation of the idling vibration, thereby attaining the lowest value $Q_2$ of the dynamic spring constant in the idling vibration frequency range (around 20 to 30 Hz) as shown in FIG. 7. Although there appears another peak value $P_2$ (lower than the peak value $P_1$) of the loss factor l at a frequency (around 30 Hz) higher than the frequency at which the dynamic spring constant Kd has its lowest value $Q_2$, the peak value $P_2$ hardly affects idling vibration suppression because it is almost out of the idling vibration frequency range. The dashed line $l_2$ indicates the loss factor characteristics of the power unit mount if the second orifice passage 32 is omitted, and dashed line $Kd_2$ indicates the dynamic spring constant characteristics of the power unit mount in the case that the second orifice passage 32 is omitted. It will be understood that a hatched triangular section T in FIG. 7 indicates the decrease in the dynamic spring constant produced by the power unit mount of this embodiment.

It is to be noted that during generation of engine shake, the movement of the movable plate 34 of the movable plate arrangement M disposed in the second orifice passage 32 exceeds its movable range (clearance $\delta_0$) under the larger amplitude vibration of the engine shake. This causes the movable plate 34 to close the openings 36a, 36b of the casing 36 of the movable plate arrangement M, so that movement of the fluid within the second orifice passage 32 is interrupted thereby rendering the fluid in a stuck state. Accordingly, during generation of engine shake, the fluid moves only through the first orifice passage 30 and therefore the fluid confined in the main fluid chamber 20 is prevented from being discharged through the second orifice passage 32 during suppression of displacement of the power unit, thereby noticeably improving the displacement suppression effect to the power unit during generation of the engine shake.

The fluid in the first orifice passage 30 has a resonant frequency lower than that of the fluid in the second orifice passage 32. The resonant frequency is represented by the equation $f \propto \sqrt{k/m}$ is the expansion spring constant and m is the mass of the liquid). Thus it is preferable to form the first orifice passage 30 longer than the second orifice passage 32.

Figure 8:
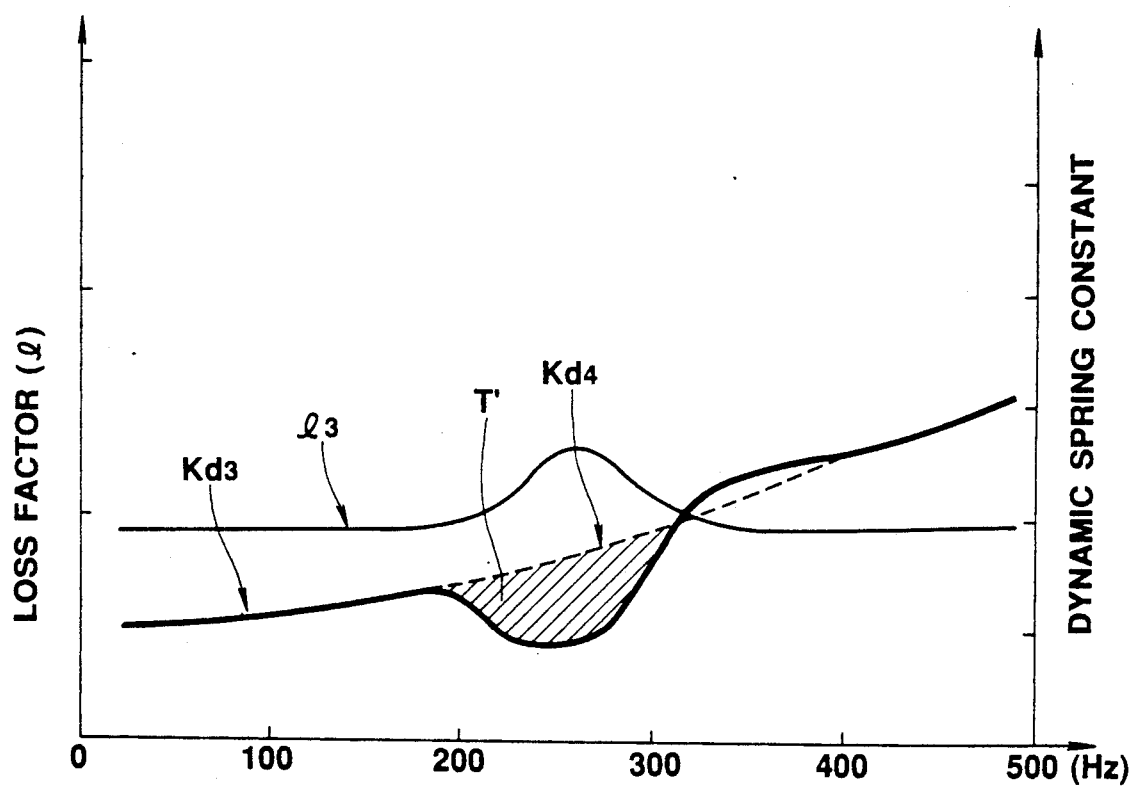
FIG. 8 is a graph illustrating the effects of an umbrella-shaped orifice forming member of the power unit mount of FIG. 1 in terms of loss factor and dynamic spring constant.

Additionally, in the above-discussed embodiment, the umbrella-shaped orifice forming member 40 is disposed within the main fluid chamber 20 and therefore the resonance vibration of the fluid within the clearance $\delta_2$ can be tuned to correspond to a high vibration frequency region (200 to 300 Hz) much higher than the above-mentioned low vibration frequency region of the engine shake and the idling vibration, thereby effectively reducing booming noise within a passenger compartment and high frequency vibrations causing noise during vehicle acceleration. Such a vibration suppression effect in the high vibration frequency region is shown in FIG. 8 in which line $l_3$ indicates the loss factor characteristics of the embodiment of FIGS. 1 to 4, and line $Kd_3$ indicates a dynamic spring constant characteristics of the same embodiment. Additionally, dashed line $Kd_4$ indicates the dynamic spring constant characteristics when the umbrella-shaped orifice forming member 40 is omitted from the embodiment of FIGS. 1 to 4. Accordingly, the hatched region T' in FIG. 8 indicates the decrease in the dynamic spring constant caused by the umbrella-shaped orifice forming member 40.

What is claimed is:

1. A power unit mount for supporting on a vehicle body a power unit which generates a first vibration in a first frequency range and a second vibration in a second frequency range higher than the first frequency range, said power unit mount comprising:

an inner cylindrical member;

an outer cylindrical member disposed around said inner cylindrical member, the first and second vibrations being applied between said inner and outer cylindrical members;

an elastic support body securely disposed between said inner and outer cylindrical members to support load of the power unit;

a first fluid chamber formed in said elastic support body;

a second fluid chamber which is separate from said first fluid chamber and is defined, in part, by an elastic diaphragm;

a fluid which fills said first and second fluid chambers;

first and second orifice passages which fluidly connect said first and second fluid chambers and extend along the inner periphery of said outer cylindrical member and are filled with said fluid, the first fluid orifice passage being dimensioned such that the fluid within the first orifice passage has a resonance point so as to damp the first vibration and the second fluid orifice passage being dimensioned such that the fluid within the second orifice passage has a resonance point so as to damp the second vibration; and a fluid movement controller for preventing the fluid from movement through said second orifice passage between said first and second fluid chambers under input of the first vibration and for allowing the fluid to move through said second orifice passage between said first and second fluid chambers under input of the second vibration.

2. A power unit mount as claimed in claim 1 wherein the resonance point of the fluid within said first orifice passage increases the loss factor of the power unit mount in response to the first vibration and the resonance point of the fluid within the second orifice passage lowers the dynamic spring constant of the power unit mount in response to the second vibration.

3. A power unit mount as claimed in claim 1 wherein said first orifice passage has a cross-sectional area such that the loss factor is a maximum in the first frequency range, and said second orifice passage has a cross-sectional area such that the dynamic spring constant is lowest in the second frequency range.

4. A power unit mount as claimed in claim 1 wherein said diaphragm is generally cylindrical and is disposed in contact with the inner periphery of said outer cylindrical member.

5. A power unit mount as claimed in claim 4 further comprising an intermediate cylindrical member disposed between said cylindrical elastic diaphragm and said elastic support body, said intermediate cylindrical member having a plurality of grooves formed along its outer periphery, said intermediate cylindrical member being in seal contact with said cylindrical elastic diaphragm, said orifice passages comprising the space between the inner periphery of said cylindrical elastic diaphragm and the surface of each groove.

6. A power unit mount as claimed in claim 1 wherein said fluid movement controller includes a casing disposed in said second orifice passage, said casing having an opening connected to said second orifice passage and a movable member adapted to move to close said opening in said casing in response to the first vibration.

7. A power unit mount as claimed in claim 6 wherein said movable member is made of an elastomeric material and separated by a predetermined distance from a wall of said casing, said movable member being movable over said predetermined distance in response to said first vibration so as to contact said casing wall and close said opening.

8. A power unit mount as claimed in claim 1 wherein said first frequency range is around 10 Hz, and said second frequency range is within a range of from 20 to 30 Hz.

9. A power unit mount as claimed in claim 1 wherein said outer cylindrical member is connected to a power unit, and said inner cylindrical member is connected to a vehicle body.

10. A power unit mount as claimed in claim 1 further comprising an elastic plate disposed within said first fluid chamber and located generally parallel with a wall of said first fluid chamber, said elastic plate being separated by a predetermined distance from the wall of said first fluid chamber, said elastic plate member being connected to said inner cylindrical member so as to move with said inner cylindrical member.

11. A power unit mount as claimed in claim 1 wherein the fluid is a liquid.

12. A power unit mount as claimed in claim 1 wherein the fluid movement controller comprises:
   a casing disposed along the inner periphery of the outer cylindrical member and having a first opening which communicates with the second orifice passage and a second opening which communicates with the inside of one of the fluid chambers; and
   an elastic member secured to the inside of the casing and elastically deformable to open and close the openings in the casing when vibrated at the first vibration.

13. A power unit mount as claimed in claim 12 wherein the elastic member comprises a plate having ends secured to the inside of the casing, lateral surfaces separated from the first and second openings by prescribed clearances, and grooves formed in the lateral surface for controlling the elasticity of the plate.

14. A power unit mount for supporting a power unit on a vehicle body comprising:
   an inner cylindrical member;
   an outer cylindrical member disposed around the inner cylindrical member;
   an elastic support body connected between the inner and outer cylindrical members;
   a first fluid chamber formed in the elastic support body;
   a second fluid chamber disposed between the inner and outer cylindrical members separate from the first fluid chamber;
   an elastic diaphragm having a smaller elastic constant than the elastic support body and forming an air chamber between the outer cylindrical member and the second fluid chamber;
   a fluid which fills the first and second fluid chambers;
   a first passage which fluidly connects the first and second fluid chambers and extends along the inner periphery of the outer cylindrical member and is filled with the fluid, the first passage being dimensioned such that the fluid within the first passage has a first resonant frequency;
   a second passage which fluid connects the first and second passages and extends along the inner periphery of the outer cylindrical member alongside the first passage and is filled with the fluid, the second passage being shorter than the first passage such that the fluid within the first passage has a second resonant frequency which is higher than the first resonant frequency; and
   a fluid movement controller for preventing the fluid from movement through the second passage between the first and second fluid chambers when subject to vibration in a first frequency range including the first resonant frequency, and for allowing the fluid to move through the second passage between the first and second fluid chambers when subject to vibration in a second frequency range higher than the first frequency range and including the second resonant frequency.

15. A power unit mount as claimed in claim 14 wherein the first frequency range corresponds to the frequency of shaking of an automotive engine and the second frequency range corresponds to the frequency of idling vibration of an automotive engine.

16. A power unit mount for supporting a power unit on a vehicle body comprising:
   an inner cylindrical member;
   an outer cylindrical members disposed around the inner cylindrical member;
   an elastic support body connected between the inner and outer cylindrical members and having a space formed therein;
   a rigid partition which is mounted in the space in the elastic support body and partitions the space into a first fluid chamber and a second fluid chamber located radially outwards from the first fluid chamber;
   an elastic diaphragm which separates the second fluid chamber from the inner surface of the outer cylindrical member and has a lower elastic constant than the elastic support body;
   a fluid which fills the first and second fluid chambers;
   a first passage which extends circumferentially along the inner periphery of the outer cylindrical member between the first and second chambers and is filled with the fluid, the first passage being dimensioned such that the fluid within the first passage has a first resonant frequency corresponding to the frequency of shaking of an engine;

a second passage which extends circumferentially along the inner periphery of the outer cylindrical member between the first and second chambers and is filled with the fluid, the second passage being dimensioned such that the fluid within the second passage has a second resonant frequency higher than the first resonant frequency and corresponding to the frequency of idling vibration of an engine; and a fluid movement controller for preventing the fluid from movement through the second passage between the first and second fluid chambers when subject to vibration in a first frequency range including the first resonant frequency, and for allowing the fluid to move through the second passage between the first and second fluid chambers when subject to vibration in a second frequency range higher than the first frequency range and including the second resonant frequency.

17. A power unit mount as claimed in claim 16 wherein the first frequency range corresponds to the frequency of shaking of an automotive engine and the second frequency range corresponds to the frequency of idling vibration of an automotive engine.

* * * * *

UNITED STATES PATENT AND TRADEMARK OFFICE
CERTIFICATE OF CORRECTION

PATENT NO. : 5,035,407
DATED : July 30, 1991
INVENTOR(S) : Takeguchi et al It is certified that error appears in the above-identified patent and that said Letters Patent is hereby corrected as shown below:

Column 10, line 49, change "members" to "member".

Signed and Sealed this

Thirteenth Day of April, 1993

Attest:

STEPHEN G. KUNIN

*Attesting Officer*            *Acting Commissioner of Patents and Trademarks*